United States Patent Office 3,442,771
Patented May 6, 1969

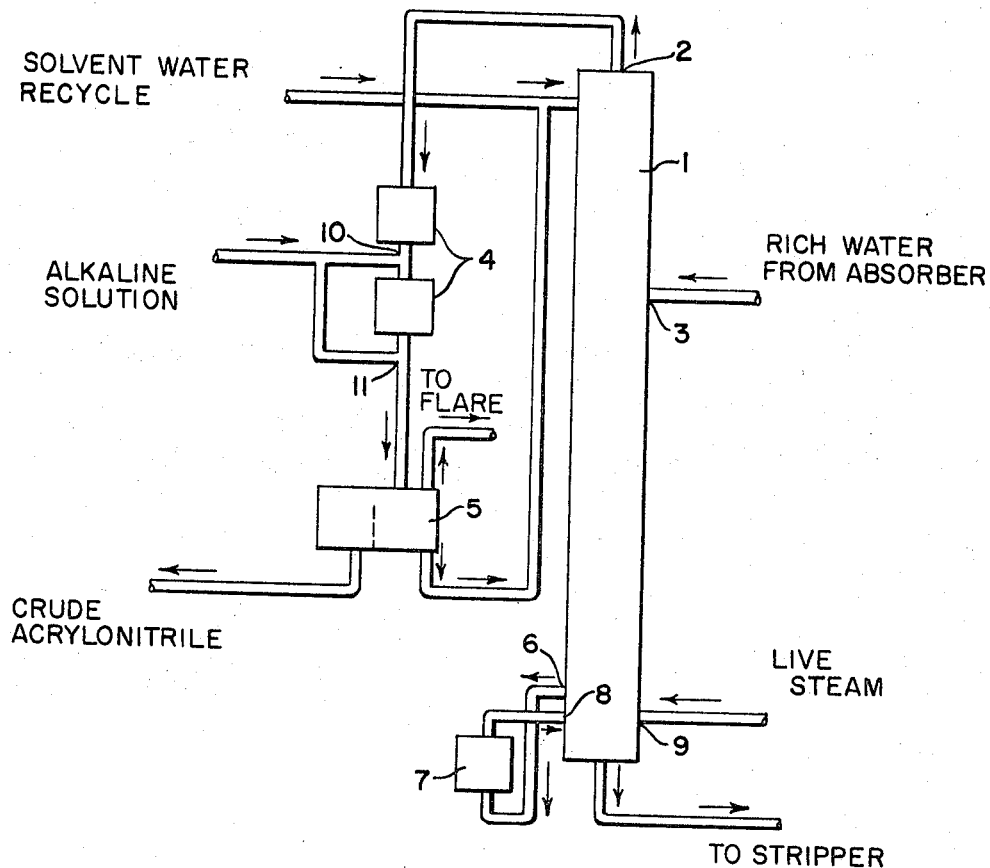

3,442,771
EXTRACTIVE DISTILLATION PROCESS FOR SEPARATING NITRITES, PEROXIDES AND PRECURSORS THEREOF FROM CRUDE UNSATURATED NITRILES SATURATED WITH WATER BY ALKALINE ADDITION
Jackie B. Jordan and Thomas R. White, Lima, Ohio, assignors to The Standard Oil Company, Cleveland, Ohio, a corporation of Ohio
Filed Aug. 16, 1967, Ser. No. 661,087
Int. Cl. B01d *3/34*
U.S. Cl. 203—33         4 Claims

ABSTRACT OF THE DISCLOSURE

This application relates to the removal of trace impurities from an unsaturated nitrile contaminated with water. More particularly, the instant application relates to a process for the removal of trace compounds having particular characteristics of a nitrite, which compounds, like peroxides, give a positive iodometric test, by addition of a sufficient quantity of an alkaline solution to a partially condensed azeotrope of the unsaturated nitrile with water which azeotrope is obtained as an overhead stream from an extractive distillation column which uses water as the solvent to separate said unsaturated nitrile from saturated nitriles and minor quantities of other compounds which are obtained as a result of the catalytic ammoxidation of monoolefins to unsaturated nitriles.

BACKGROUND OF THE INVENTION

Product acrylonitrile must meet extremely rigid specifications. This is because acrylonitrile is used as a monomer in a large number of polymerization reactions and contamination with certain impurities is an extremely undesirable characteristic in that it jeopardizes the polymerization reaction. Such compounds include various nitrites, peroxides and precursors thereof. The specification for product acrylonitrile requires that the concentration of compounds which give a positive iodometric test be less than two-tenths of any one part per million (0.2 p.p.m.). Calibration for the test is done against a known quantity of hydrogen peroxide. It will be apparent that compounds in such trace concentrations are difficult to identify and even more difficult to isolate and destroy. Destruction of the trace impurity is further complicated by two factors, (a) the necessity of deciding precisely at what point in the process of manufacturing unsaturated nitriles said impurity should be destroyed, and (b) the importance of destroying said impurity without introducing new contaminants into the desired product. Impurities are generally introduced in the reaction stage of manufacture of the α-β monoolefinically unsaturated nitrile, in the reactors. However, it is quite likely that deleterious impurities are introduced by other steps in the process, namely, neutralization with dilute acid, extraction with water, etc., especially when it is borne in mind that these impurities may be present in a concentration range which does not exceed a few parts per million.

Processes and catalysts for the manufacture of acrylonitrile and methacrylonitrile by the ammoxidation of propylene and isobutylene, respectively, have been described in U.S. Patents Nos. 2,481,826, 2,904,580, 3,044,966, 3,050,546, 3,197,419, 3,198,750, 3,200,084, 3,230,246, 3,248,340; British Patents Nos. 874,593 and 904,418; Belgian Patents Nos. 592,434, 593,097, 598,511, 603,030, 612,136, 615,605, 603,031; Canadian Patent No. 619,497 and French Patent No. 1,278,289.

When an olefin, propylene or isobutylene, for example, is reacted with ammonia and molecular oxygen to produce the corresponding unsaturated nitrile, such as acrylonitrile or methacrylonitrile, there are also produced relatively small quantities of various compounds such as hydrogen cyanide, saturated aliphatic nitriles, such as acetonitrile, carbonyl compounds of relatively low molecular weight, such as acetaldehyde, propionaldehyde, acrolein, methacrolein, etc., and trace quantities of other compounds which may be described generally as nitrites, peroxides and precursors thereof. The desired products of reaction are recovered by absorption in a suitable solvent such as water, during which step additional heavy, organic compounds may be formed. More preferably, the products of reaction are recovered by first quenching with a dilute acid, such as sulfuric acid, which serves to neutralize excess ammonia present in the reactor effluent, and then by absorption in water.

The products of reaction in the ammoxidation of propylene are separated from "rich" absorber water in an extractive distillation column (called the recovery column). Overhead from the recovery column is an azeotrope of acrylonitrile and water, and the bottoms is an aqueous stream containing acetonitrile which is removed in another distillation column (called the stripper column). In a plant for the manufacture of methacrylonitrile, the nitrile recovered will be methacrylonitrile and the by-products recovered will be the corresponding compounds formed from isobutylene.

Processes for the recovery and purification of the desired monoolefinically unsaturated nitrile, such as acrylonitrile and methacrylonitrile, are described in copending U.S. application Ser. No. 546,839, now U.S. Patent No. 3,352,764, and U.S. Patents Nos. 2,904,580, 3,044,966 and 3,198,750.

A discussion of the problems involved in separating mixtures comprising acrylonitrile, acetone and water, as well as a means for accomplishing the separation by distillation in the presence of gross amounts of added water is given in U.S. Patent No. 2,681,306.

A discussion of the problems involved in the separation of similar mixtures from small amounts of various saturated carbonyl compounds is found in U.S. Patent No. 3,149,055.

A process for the production of substantially pure, unsaturated aliphatic nitriles from an impure mixture containing the desired unsaturated nitrile together with the corresponding unsaturated aliphatic aldehyde and hydrogen cyanide as impurities, is disclosed in U.S. Patent No. 2,836,614.

Still another process for the separation of an unsaturated nitrile such as acrylonitrile or methacrylonitrile, from small amounts of saturated carbonyl compounds is disclosed in U.S. Patent 3,185,636.

It is preferred that any compound added to the nitrite-containing nitrile should be added prior to purification of the nitrile in the product column so that the reaction product of the trace impurity and the added compound may be readily separated and discharged from the product stream. The added compound is also called a "scavenger," and any water soluble alkaline compound will act as an effective scavenger. Logical places to add the scavenger would be either in the absorber, the stripper column, or in the recovery column or in more than one column simultaneously. A preferred location for addition of the scavenger is as a relatively dilute aqueous solution, as described hereinafter, in the overhead of the recovery column. As the desired nitrile is distilled overhead as an azeotrope with water in the recovery column, it is possible to extract into the aqueous phase a water-soluble reaction product of the undesirable impurity and the scavenger to remove said impurity from the product.

Briefly, the product unsaturated aliphatic nitrile such as acrylonitrile or methacrylonitrile is cooled in a quench tower with an acidified water stream by countercurrent contact. Gases from the quench tower are led into the bottom of an absorber where acrylonitrile, acetonitrile and other relatively soluble gases are absorber. The non-absorbed gases are led to a stack and disposed of.

Conventionally, the stream from the bottom of the absorber, known as the rich water stream, is led into a recovery column where it is extractively distilled. The recovery column may be any suitable contacting means in which liquid and vapor are countercurrently contacted in a multiplicity of communicating zones or stages. The overhead vapors from the recovery column are enriched in acrylonitrile, other components being chiefly water and hydrogen cyanide, and contaminated with undesirable impurities such as nitrites, compounds which have characteristics of nitrites, and precursors thereof. The overhead vapors are condensed and collected in a decanter, the liquid undergoes liquid-liquid phase separation, the less dense layer being an organic phase, the denser lower layer being an aqueous phase. The organic phase being chiefly acrylonitrile contaminated with water and hydrogen cyanide, is withdrawn for further purification. The aqueous phase is refluxed to the upper section of the recovery column.

The process of the instant invention comprises destroying trace impurities of nitrites and precursors thereof, in the overhead of the recovery column by reacting said impurities with an alkaline solution in such a manner as to allow the reaction product to be extracted into the aqueous phase, which may then be separated from the crude acrylonitrile phase.

Presence of nitrites and precursors thereof was confirmed by a colorimetric nitrite-selective chemical test which is applicable in the range 0.02 to 1.0 part per million nitrite (as $NO_2^-$) in acrylonitrile. The test comprises a diazotization and coupling reaction with 1-naphthylamine.

SUMMARY

It is an object of this invention to destroy trace nitrite impurities and precursors thereof in the crude acrylonitrile product obtained in the overhead of the recovery column.

It is a further object of this invention to react trace impurities comprising nitrites and precursors thereof with an alkaline solution of a basic salt in water, and to extract the reaction product of said impurities with said alkaline solution into the aqueous layer obtained in a liquid-liquid phase separation of the recovery column overhead stream, which aqueous layer is recycled into the recovery column.

It is another object of this invention to inject an effective quantity of scavenger solution, preferably a 10 percent solution of sodium carbonate in water, so as to maintain a pH of at least 6.0 in the aqueous layer obtained in the phase separation of the recovery column overhead.

BRIEF DESCRIPTION OF THE DRAWING

The drawing shows a recovery column 1 being fed by the rich water stream from the absorber at a point 3 in the upper section of the recovery column 1. Overhead vapors leave the recovery column 1 at 2, the top of the column and are condensed in the condensers 4. The liquid-liquid phase separation is carried in decanter drum 5. A reboiler is shown at 7 with supplemental heat being supplied by live steam at 9.

PREFERRED EMBODIMENT OF THE INVENTION

The following is a more detailed description of a specific embodiment of the instant invention wherein the α-β monoolefinically unsaturated nitrile is acrylonitrile, the absorption medium used is water, and the saturated aliphatic nitrile is acetonitrile.

In referring to the figure, it can be seen that the feed stream of rich water is introduced into the recovery column 1 at a feed tray shown at 3 which is about two-thirds the way to the top of the recovery column 1 fitted with fractionating plates. Other liquid-vapor contacting means such as columns packed with Raschig rings, Berl saddles and the like, may be used, but sieve trays are preferred. The vapors distilled overhead at 2 are condensed in the vapor condenser 4 which is a dual condenser, and the condensate then passes to the decanter 5 where a phase separation takes place, the organic layer (the crude acrylonitrile phase) being removed for further purification, and the water layer (the acrylonitrile-depleted aqueous phase), being returned to the upper section of the recovery column 1. The water layer reflux may be returned to the recovery column 1 at the feed tray 3, or near the top of the recovery column 1, or between the feed tray 3 and the top 2, according to the operating characteristics desired in the column. An advantage of introducting the water layer reflux into the recovery column at a location lower than the top plate is that it avoids the build-up of undesirable, water-soluble organic components, including the reaction product formed with the undesirable trace impurities, which tend to flash on the top plate and consequently accumulate in the water layer reflux stream. It will be apparent to one skilled in the art that the process of this invention would be operable even if the water layer reflux were introduced below the feed tray but there would be no special reason for doing so. The lower the point of return of the water layer reflux below the feed plate, the more acrylonitrile would have to be stripped out of the bottom section of the recovery column 1.

Other means for separating the organic phase from the aqueous phase of the condensate may be employed. For example, the condensate may be directly flowed through materials such as silica gel, molecular sieves and the like which will preferentially remove water and components dissolved therein. A liquid-liquid centrifuge may also be used to separate the lighter organic phase from the heavier aqueous phase.

The heat duty required to produce the necessary boil-up in the bottom of the recovery column 1 may be provided by heat transfer in any conventional reboiling apparatus, for example by removing liquid at or near the bottom of the column 1, as shown at 6, and heat exchanging the liqiud in a thermosiphon reboiler 7. The effluent from the thermosiphon reboiler is returned to the bottom of the recovery column 1 at 8. Live steam 9 may be injected either to supplement or to replace the required heat duty of the recovery column 1. A bottoms stream rich in acetonitrile is led from the recovery column 1 into a stripper column not shown in the flow diagram.

An aqueous solution of sodium carbonate in the range of 0.1 to 35 parts $Na_2CO_3 \cdot 7H_2O$ per hundred parts water is introduced at 10 between the first and the second heat exchanger stages in the recovery column overhead condenser in an amount sufficient to react with the impurities present. The sodium carbonate solution may also be introduced after the heat exchanger at 11 and prior to the decanter in the recovery column overhead which separates the aqueous and the organic phases. The essential point is that the sodium carbonate solution should be introduced into the condensate of the recovery column overhead in a manner which will allow sufficient time for the reaction product of the impurity and the sodium carbonate solution to form, as well as provide enough turbulence to allow the product to be extracted into the aqueous phase. It will be apparent that, should the reaction product of the impurity and sodium carbonate solution not be extracted into the aqueous phase, it would be carried over in the organic phase, and result in the product contamination which is specifically sought to be negated.

The following example gives typical flow rates of streams into and out of the recovery column in gallons per minute:

Rich water from absorber _____ 925
Aqueous phase reflux from decanter _____ 43

| | |
|---|---|
| Recovery column overhead | 127 |
| Organic phase from decanter | 84 |
| Sodium carbonate solution (10%) | 0.5 |
| Recovery column bottoms | 1622 |
| Solvent water recycle | 654 |
| pH of aqueous phase reflux from decanter | 6.5 |
| Nitrite and peroxide impurities present in aqueous in aqueous phase of recovery column decanter p.p.m. | 190 |
| Nitrite and peroxide impurities present in organic phase of recovery column decanter p.p.m. | <1 |

We claim:

1. In a process for the removal of nitrite impurities and precursors thereof while separating an α-β monoolefinically unsaturated nitrile from a saturated nitrile in the presence of water, wherein a mixture of said nitriles and water is fed to an extractive distillation column, the overhead stream from said column being condensed and the condensate being subjected to a phase separation the organic phase being removed for further purification and the aqueous phase being recycled to the upper section of said column and, wherein heat is supplied to provide the heat duty for boil-up in the lower portion of said tower, a bottoms stream being continuously withdrawn from said tower, the improvement consisting of injecting an effective quantity of an aqueous alkaline solution reactive with said impurities and precursors thereof into the liquid phase of said overhead stream after partial condensation thereof so as to contact both the organic and the aqueous materials in said liquid phase and to extract said impurities from the organic phase into the aqueous phase, wherein the concentration of soluble alkaline material is insufficient to measurably affect the realtive volatility of said materials with respect to one another under the plant operating conditions of said column in the absence of said soluble alkaline material.

2. The process of claim 1 wherein said solution comprises an alkaline alkali metal salt solution.

3. The process of claim 2 wherein said solution comprises an alkali metal salt of carbonic acid.

4. The process of claim 3 wherein said solution comprises at least 0.5 percent by weight sodium carbonate solution in water, and is injected into said overhead stream at a rate in the range of about 1 to 5 parts sodium carbonate solution to 100 parts of overhead stream.

References Cited

UNITED STATES PATENTS

| | | | |
|---|---|---|---|
| 2,614,072 | 10/1952 | Carlson et al. | 203—37 |
| 2,807,573 | 9/1957 | Robertson | 203—33 |
| 2,827,423 | 3/1958 | Carpenter | 203—95 |
| 3,007,853 | 11/1961 | Patron et al. | 203—37 |
| 3,201,451 | 8/1965 | Idol et al. | 203—33 |
| 3,328,266 | 6/1967 | Modiano et al. | 203—96 |
| 3,352,764 | 11/1967 | Tyler | 203—55 |

WILBUR L. BASCOMB, JR., *Primary Examiner.*

U.S. Cl. X.R.

203—36, 37, 42, 96; 260—465.9